United States Patent
Fong et al.

(10) Patent No.: US 11,093,918 B2
(45) Date of Patent: Aug. 17, 2021

(54) CASINO MONETARY SYSTEM WITH INTEGRATED EXTERNAL ID AUTHENTICATION AND TRANSACTION RECORD GENERATION

(71) Applicant: Everi Payments Inc., Austin, TX (US)

(72) Inventors: Adam Fong, Las Vegas, NV (US); Suresh Narayanan, Las Vegas, NV (US); Marc Gurney, Las Vegas, NV (US); Vinothkumar Subramanian, Las Vegas, NV (US)

(73) Assignee: Everi Payments Inc., Las Vegas, NV (US)

(*) Notice: Subject to any disclaimer, the term of this patent is extended or adjusted under 35 U.S.C. 154(b) by 0 days.

(21) Appl. No.: 16/590,470

(22) Filed: Oct. 2, 2019

(65) Prior Publication Data

US 2020/0111073 A1     Apr. 9, 2020

Related U.S. Application Data

(60) Provisional application No. 62/741,499, filed on Oct. 4, 2018.

(51) Int. Cl.
| | |
|---|---|
| *G06Q 20/40* | (2012.01) |
| *G06Q 20/18* | (2012.01) |
| *G07F 17/32* | (2006.01) |
| *G06Q 20/04* | (2012.01) |

(52) U.S. Cl.
CPC ........... *G06Q 20/18* (2013.01); *G06Q 20/042* (2013.01); *G06Q 20/4014* (2013.01); *G07F 17/3209* (2013.01); *G07F 17/3246* (2013.01)

(58) Field of Classification Search
CPC . G06Q 20/18; G06Q 20/4014; G07F 17/3246
See application file for complete search history.

(56) References Cited

U.S. PATENT DOCUMENTS

| | | | |
|---|---|---|---|
| 6,951,302 B2 | 10/2005 | Potts | |
| 7,461,780 B2 | 12/2008 | Potts et al. | |
| 7,922,581 B2 | 4/2011 | Potts | |
| 8,960,547 B2* | 2/2015 | Lebaschi | G06K 7/10851 |
| | | | 235/454 |
| 9,269,224 B2* | 2/2016 | Williams | G07F 17/3209 |
| 2007/0094721 A1* | 4/2007 | Nguyen | G07F 17/32 |
| | | | 726/9 |
| 2011/0183747 A1* | 7/2011 | Cole | G07F 17/32 |
| | | | 463/25 |

(Continued)

OTHER PUBLICATIONS

FinScan Premium, FinScan Premium AML Compliance, https://www.innovativesystems.com/finscan-aml-compliance, dated Jan. 12, 2020, 11 pages.

(Continued)

*Primary Examiner* — Christle I Marshall
(74) *Attorney, Agent, or Firm* — Weide & Miller, Ltd.

(57) ABSTRACT

Casino monetary systems and methods of processing casino monetary transactions are configured to read or scan an ID of a customer associated with a monetary value transaction, to transmit that ID information to a remote authentication vendor for authentication, to then use that authentication information as part of a transaction approval process and to create a transaction record, such as relative to an anti-money laundering (AML) system.

19 Claims, 3 Drawing Sheets

(56) References Cited

U.S. PATENT DOCUMENTS

2013/0018796 A1* 1/2013 Kolhatkar .............. G06Q 20/28
705/44
2018/0053194 A1 2/2018 Bond et al.

OTHER PUBLICATIONS

VeriDocs, ID Authentication, Facial Compare and Watch List Management, www.veridocs.com/our-technology, dated Jan. 12, 2020, 7 pages.

* cited by examiner

CASINO MONETARY SYSTEM WITH INTEGRATED EXTERNAL ID AUTHENTICATION AND TRANSACTION RECORD GENERATION

RELATED APPLICATION DATA

The present application claims priority to U.S. Provisional Application Ser. No. 62/741,499, filed Oct. 4, 2018, which prior application is incorporated herein by reference in its entirety.

FIELD OF THE INVENTION

The present invention relates to casino monetary transactions, such as player check cashing at a casino cashier station.

BACKGROUND OF THE INVENTION

Casinos general operate one or more casino "cages." These cages are cashier stations at which various financial transactions may be performed, generally with the aid of a cashier. As one example, a player who has winnings from the play of a table game may desire to cash in their chips. The player may take the chips to the cashier at the casino cage in order to trade those chips for monetary funds.

As another example, a player may need funds in order to fund wagering at a gaming table, gaming machine or the like. The player may present a check to the casino which the casino will cash and convert to monetary funds or a monetary value equivalent (chips, a monetary value ticket, etc.).

Usually, the cashier will ask for some form of identification from the player to verify that they are the issuer of the check. This might comprise, for example, a driver's license. For example, the cashier might check the name on the driver's license against the payor's name on the check and perhaps check the photo on the driver's license to the player. If that information matches, the cashier may process the check and issue the monetary funds or equivalent value to the player.

Of course, in such a situation, the check and the driver's license may, for example, be forged or fraudulent. However, this may be difficult for the cashier to detect.

Another problem with the existing cashier station activities is that many of them are associated with regulated activities. For example, dependent upon the size of the transaction, the casino may be required to report the transaction. At the end of the day, the casino may review all cage transactions to determine those which meet reporting requirements and then create reports for those transactions.

An improved casino monetary system which addresses these and other issues is desired.

SUMMARY OF THE INVENTION

Embodiments of the invention comprise casino monetary systems and methods of processing casino monetary transactions which are configured to read or scan an ID of a customer associated with a monetary value transaction, to transmit that ID information to a remote authentication vendor for authentication, to then use that authentication information as part of a transaction approval process and to create a transaction record, such as relative to an anti-money laundering (AML) system.

In one embodiment, a casino monetary system includes a cashier cage with a workstation, and ID reader and a cash dispenser. A cashier may utilize the workstation to initiate a cash transaction, such the cashing of a check or a debit or credit cash transaction for a customer. The cashier preferably scans the customer's ID. The system is configured to communicate with one or more external vendor systems which are configured to authenticate IDs. The scanned ID information is transmitted to the one or more vendors for authentication. The results of the authentication are preferably utilized in an approval process for the transaction. If the transaction is approved, the transaction may be completed, such as by having the cash dispenser dispense cash to the cashier which the cashier can give to the customer.

Advantageously, information regarding the transaction is preferably transmitted to the AML system. This information includes the ID authentication results. The transaction information may be used by the AML system for legal reporting requirements as well as for investigative purposes, such as in the even the ID was determined to not be authentic.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise casino monetary systems and methods of processing casino monetary transactions.

Figure 1:
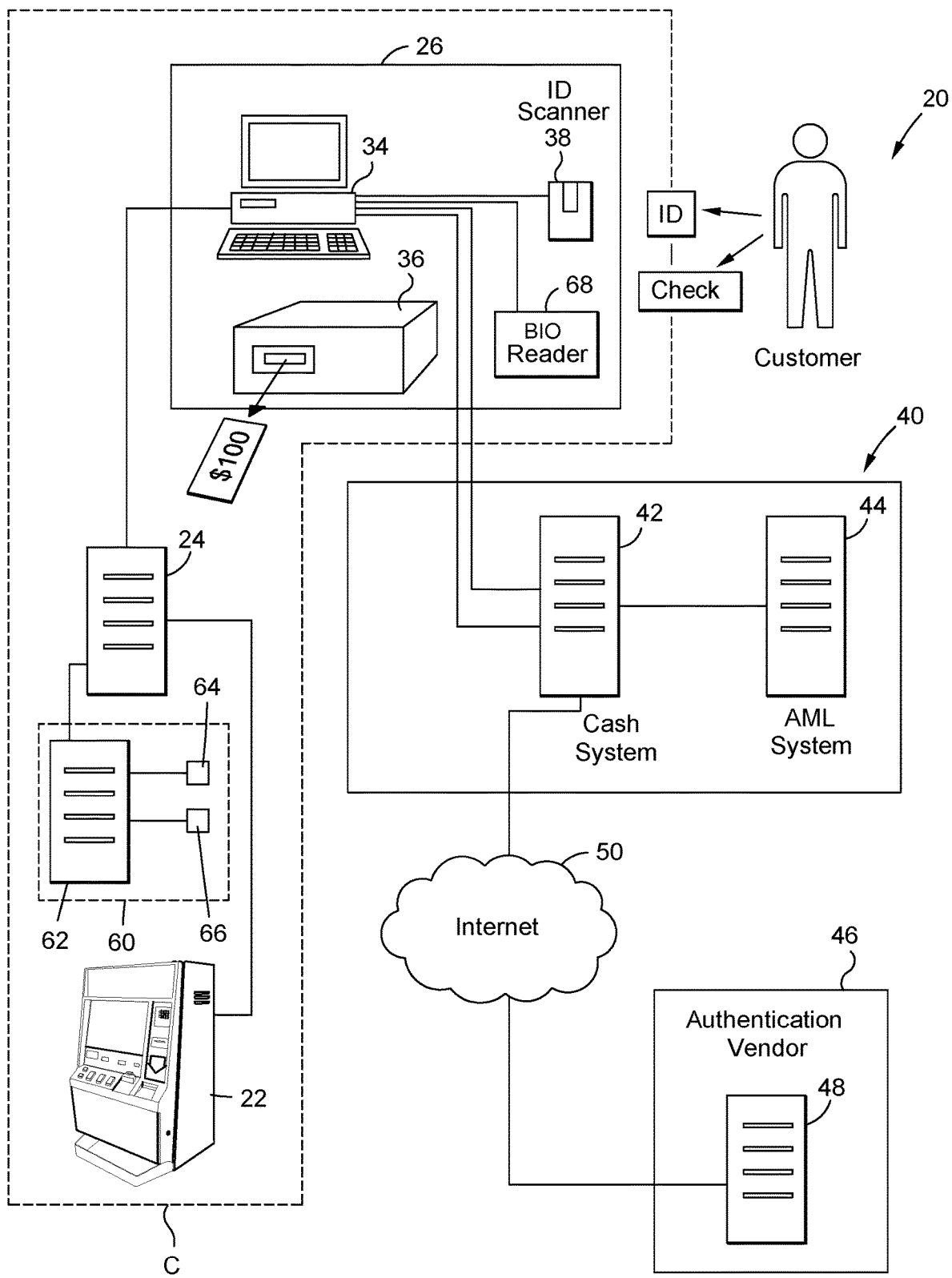
FIG. 1 illustrates one embodiment of a system of the present invention.

One embodiment of a system 20 of the invention is illustrated in FIG. 1. The system 20 includes a casino gaming system C. This system C may include a plurality of gaming devices, such as one or more gaming machines 22. The casino gaming system C may include other types of gaming devices such as gaming tables and the like, as which one or more games, and preferably wager-based games which offer a play the opportunity for winnings, are presented.

The casino gaming system C may include a wide variety of other features or elements. For example, the casino gaming system C may include one or more casino servers 24 (or similar computing devices). The casino servers 24 may comprise one or more processors or controllers, at least one communication device or interface, a database or other data storage device, and one or more additional memory or data storage devices (such as separate from the database). In one or more embodiments, the processor(s) is configured to execute one or more instructions, such as in the form of machine readable code (i.e. "software"), to allow the server 24 to perform various functionality, such as the functionality described herein. The software is preferably non-transitory, such as by being fixed in a tangible medium. For example, the software may be stored in the one or more memory devices. One or more of the memory devices may be read-only. In addition, the software may be stored on a removable medium in some embodiments. In general, the one or more memory devices are used as temporary storage. For example, the one or more memory devices may be random access memory or cache memory used to temporarily store some user information and/or instructions for execution by the at least one processor.

The software may comprise one or more modules or blocks of machine-readable code. Each module may be configured to implement particular functionality when executed by the one or more processors, and the various modules may work together to provide overall integrated functionality. Of course, in certain embodiments, it is also possible for various of the functionality to be implemented as hardware, i.e. a processor or chip which is particularly designed to implement various of the functionality described herein.

In one embodiment, the casino server 24 may include (or be linked communicatively at one or more times to) one or more input and/or output devices, such as a keyboard, mouse, touchscreen, video display or the like, whereby the processor may receive information from an operator or servicer of the server 24 and/or output information thereto. This allows, for example, an operator of the server 24 to interface with the server 24 to upgrade, maintain, monitor, etc., it. In other embodiments, an operator might interface with the server 24 via a separate workstation or other device.

In one embodiment, the processor and other elements of the server 24 may be linked and thus communicate over one or more communication buses. In this manner, for example, the processor may read/receive software from the memory for execution, receive inputs and provide outputs to the various I/O devices, receive information from or output information to external devices via the communication interface, etc. The one or more communication devices or interfaces permit the server 24 to communicate with the gaming machines 22 or other gaming devices, and preferably external devices, networks, systems and the like.

The casino server 24 may be configured to implement a variety of functionality (and/or there may be a plurality of different servers which each implement different functionality). In one embodiment, the server 24 may implement accounting functionality. The accounting functionality might include tracking of wagers made and winnings paid at the gaming machines 22 and, as described in more detail below, monetary transactions at a cashier cage 26, such as tracking the amounts of casino chips issued and redeemed, checks cashed, etc. In the case of a gaming system which includes the issuance of monetary value tickets or the like, the server 24 may also generate monetary value ticket data, validate tickets and the like.

The cashier cage 26 of the casino gaming system C may include a cashier workstation 34, a monetary value dispensing mechanism 36 and an ID reader 38. The workstation 34 may comprise, for example, a computing type device which comprises a processor, a memory, software stored in the memory for execution by the processor, one or more cashier input devices (such as a keyboard or keypad, mouse, etc.), a communication interface and at least one video display.

In one embodiment, the cashier workstation 34 is configured to communicate with the ID reader 38, such as by transmitting instructions to the reader 38 or receiving information from the reader 38. The ID reader 38 may comprise a wide variety of reading devices, such as one or more of a white light, IR and UV light scanner or reader, a magnetic stripe reader or the like. The reader 38 might be particularly configured to scan or read information associated with an ID, such as a state driver's license.

In one embodiment, the cashier workstation 34 is configured to communicate with the monetary value dispensing mechanism 36, either directly or indirectly (such as through a cash system server, as detailed below). This mechanism 36 preferably comprise a secure monetary value storage and dispensing mechanism. The mechanism 36 may be configured to store or house monetary value, such as paper currency and/or coins and, at one or more times, dispense monetary value to the cashier. One such device is sold under the name CageXchange by Everi Payments Inc. of Las Vegas, Nev.

As illustrated, the casino C may include a customer or player identification, loyalty and tracking system (a "customer" system) 60. This system 60 may comprise a customer server 62, such as a computing device with a processor, a memory, data storage, communication interface and the like, machine-readable code for execution by the processor, as well as one or more sensors, and preferably biometric sensor for capturing information regarding a customer or player. The sensors may comprise one or more of a camera 64 and a biometric reader or identifier 66 such as a fingerprint reader, retinal scanner, or other sensors for use in capturing information, and particularly information about customers or players for use in identifying those customers/players.

The system 60 may be configured to identify customers, gain and maintain customer interest in game play, and share data regarding customers. For example, the system 60 may collect information from the gaming machines 22 regarding player game play and reward players for that play, such as by awarding promotional award to them. In order to implement this functionality, the system 60 may communicate with the casino server 24, an anti-money laundering or AML system 44, a cash system 42 and/or other devices and systems (such as to provide information to those other systems or devices or to obtain information from such systems or devices).

In one embodiment, the sensors, such as the one or more cameras 64 and biometric readers 66 may, either alone or in combination with the customer server 62 or other devices/systems, be configured to identify a customer using one or more of the following information: a customer's gait; a customer's breathing; a customer's fingerprint; a customer's retinal scan; a customer's face; and the vein pattern of a customer's hand.

In one embodiment, the camera(s) 64 may include, either alone or with customer server 62, facial recognition software to identify a customer in the view of one or more cameras 64. The cameras 64 may be adapted to capture images of customers having a wide range of heights by means of one or more of: a wide angle lens suitable for capturing an expected range of customer heights; and an ability to crop an image of a customer taken by camera 64, such as to just record and analyze the face of the customer. The camera 64 may include a lens with a movable mount capable of tracking the face of a customer. In one embodiment, the camera 64 and/or customer server 62 may include the ability to discard any facial images that are not considered to be the image of a customer, such as facial images of people behind or alongside a customer.

In one embodiment, the customer system 60 may include data collected or obtained from a customer obtained at the cashier cage 26, including the ID reader 38. This customer data may include an image, such as an image scanned by ID reader 38 from a customer's driver's license, passport, or other form of identification that includes an image of the customer. In one embodiment, the casher cage 26 may include a biometric reader 68, and information from that reader may be provided to the customer system 60.

In this regard, the one or more sensors such as the camera(s) 64 and/or biometric sensor(s) 66 may be placed in various locations throughout the casino, such as at various locations throughout the casino floor. For example, the sensors might be positioned at or near the gaming machines 22, the cashier cage 26 and/or other locations.

Figure 3:
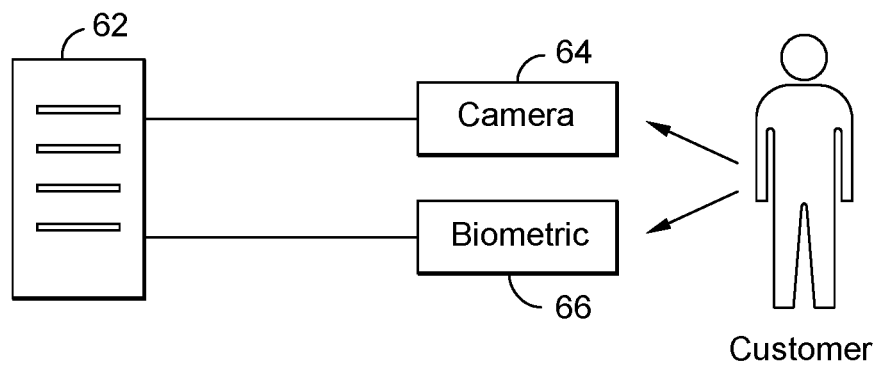
FIG. 3 illustrates aspects of biometric information capture in accordance with the present invention.
Figure 4:
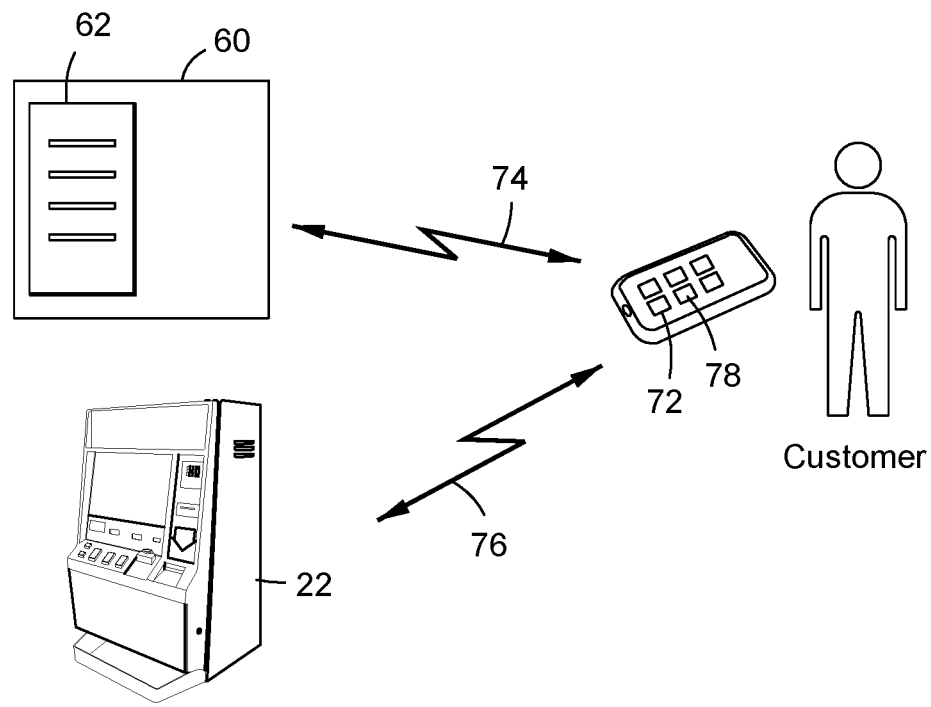
FIG. 4 illustrates aspects of a player interface in accordance with the present invention.

In one embodiment, a sensor such as the camera 64 is positioned on or at (such as connected to the gaming machine 22, such as a housing thereof, is integrated into the gaming machine 22 or is located adjacent to the machine). As illustrated in FIGS. 1, 3, and 4, in one embodiment, the customer system 60 is capable of operationally connecting (such as via a wireless communication system or network 74) with a customer loyalty application 72 (such as a downloaded software program) running on a mobile communication device 70 of a customer (wherein the application 72 may be stored in a memory of the device 70 and be executed by a processor thereof), the customer being in proximity to a particular gaming machine 22. The mobile communication device 70 may further include an electronic wallet application 78 (again, such as in the form of downloaded software code which is stored in a memory of the device 70 and which his executable by the processor thereof) which is capable of operationally connecting (such as via a wireless communication system or network 76) with a particular gaming machine 22. The customer system 60 may further evaluate the identity of the customer based in part of the customer's mobile communication device 70 having its electronic wallet application 78 and customer loyalty application 72 connected to the same gaming machine 22.

In one embodiment, collected player information, such as image or other biometric information, may be used to identify a player by comparison of the collected information to information which is stored—such as in association with the customer system 60 one or more external systems or databases.

The system 20 may further comprise a monetary transaction processing system 40. This system 40 may be configured to aid in the processing of monetary transactions at the casino, and particularly the cashier cage 26. In one embodiment, the monetary transaction processing system 40 comprises one or more servers, such as a cash system 42 server and a AML system 44 server. Each of those servers may be similar to the casino server(s) 24 noted above (such as including a processor, memory, communication interface, etc.) but include software for implementing the functionality described herein. The monetary transaction processing system 40 might be operated by a vendor of the casino or might be part of the casino system itself.

In one embodiment, AML System 44 comprises a floor monitor system that allows floor staff to view real-time information from devices in the casino, including information regarding transactions performed at those devices (such as gaming machines 22, cashier cages 26, kiosks and other devices), such as in the form of a digital multiple transaction log (MTL) and a multiple instrument log (MIL) that support transaction entry, unknown patron handling, quick alerts, and more. The AML system 44 may also include a back office system that enables a compliance team to review floor data, generate currency transactions reports (CTR) and/or suspicious activity reports (SAR) batches, and electronically file with regulators, providing a full audit log and flexible reporting of data. The AML system 44 may further comprise a connector library system that allows importation of transactional data from casino management systems without manual entry, and/or a tax forms system for completing and managing tax forms required by the IRS or other governmental agencies.

As illustrated in FIG. 1, the system 20 may be configured to communicate with other systems and elements. For example, as illustrated, the server of the cash system 42 is preferably configured to communicate with one or more authentication systems 46, such as an authentication system server 48 thereof. The communications may occur via the Internet 50 and/or other communication networks (wireless and/or wired, LANs, WANs, etc.). The authentication system 46 might comprise, for example, the FinScan® system operated by Innovative Systems, or the VeriDocs® system operated by VeriDocs, Inc.

The server of the cash system 42 might also communicate with other devices or systems. Such systems might comprise a banking system, such as for clearing or processing checks (such as for clearing a check presented by a casino customer by transferring funds from the customer's bank account to an account of the casino). Similarly, the server of the AML system 44 might communicate with one or more external devices or systems. For example, the server of the AML system 44 might be configured to transmit or report designated financial transactions, such as to appropriate regulatory agencies.

Figure 2:
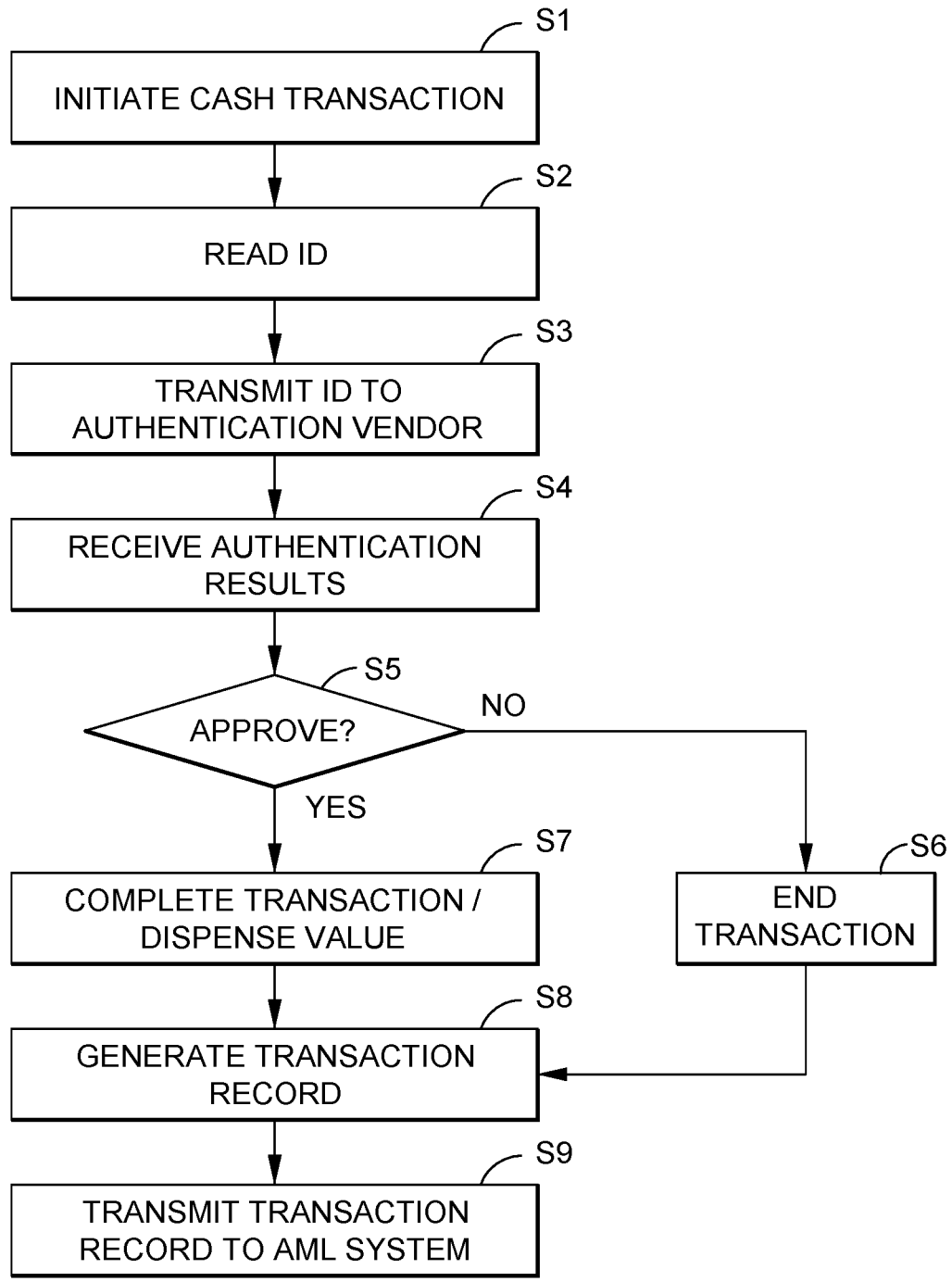
FIG. 2 is a flow chart which illustrates one embodiment of a process of the invention.

Additional aspects of the invention will be described with reference to FIG. 2, which is a flow diagram of one embodiment of a method or process in accordance with the invention. In a step S1, a customer may seek to initiate a monetary value transaction as the casino, such as at the cashier cage 26. In one embodiment, this transaction might comprise the customer tendering a check to the casino to be cashed for monetary value which the casino might issue as cash (or in other instances, a monetary value ticket, monetary value chips or the like).

In one embodiment, when a customer seeks to initiate a transaction, the cashier may start a transaction by providing input to the cashier workstation 34 to initiate the transaction (such as by starting a "cash check" transaction). Upon initiating such a transaction, the workstation 34 may be configured to present information to the cashier and/or transmit instructions or other information to other devices to process the transaction.

For example, the workstation 34 may prompt the cashier to obtain an ID from the customer and to scan the ID, as in a step S2. In this step, the customer preferably tenders an ID to the cashier. The cashier preferably reads the ID, such as by inserting it or swiping it through the ID reader 38. As noted above, the ID might comprise a state driver's license, passport or the like. The ID might be read or scanned in various manners, such as to obtain a white light image of the front and back of the ID, a UV light image of the front and back of the ID, an IR light image of the front and back of the ID, and to read information associated with any magnetic stripe associated with the ID.

In a step S3, if the ID is successfully read, the ID information is preferably transmitted to a remote authentication vendor for authentication. This step may comprise the cashier workstation 34 transmitting the read ID information to the server of the cash system 42 which, in turn, sends the information and a request for authentication to the one or more vendors. The authentication vendor preferably reviews the ID information and attempt to valid that information, such as by comparison of information associated with the ID with information in one or more databases, such as databases of state ID information and the like. Of course, the particular authentication may be dependent upon the vendor.

In a step S4, the results of the ID authentication are transmitted back, such as to the server of the cash system 42 and then to the cashier workstation 34. In a step S5, the results of the authentication may be used, at least in part, to approve or deny the requested transaction, as in a step S5. Of course, other information might be used as part of determining whether to approve or deny the transaction, such as the requested transaction amount. As one example, if the transaction amount is above a certain threshold, then it may be denied if the ID authentication results do not reach a designated degree of certainty, while that level of certainty might be lower for lower transaction amounts.

If the transaction is denied in step S5, then the server of the cash system 42 may send information to the cashier workstation 34 which indicates that the transaction should be denied. A "deny" indication might be displayed by the workstation 34 to the cashier, at which point the transaction may be ended, as in step S6. The cashier might tender the customer's check and ID back to the customer. Further, as noted below, the process may then proceed to step S8.

If the transaction is approved at step S5, then in step S7 the transaction may be completed. This might comprise, for example, the server of the cash system 42 transmitting an approval to the cashier workstation 34. At that point, the cashier workstation 34 might display information to the cashier, such as that the transaction has been approved and to validate the transaction by confirming the amount of the transaction (such as by double-checking the amount of the check to an amount displayed on the display of the workstation). If the transaction is approved, the server of the cash system 42 may send instructions to the monetary value dispensing mechanism 36 to dispense monetary value. This may comprise, for example, the mechanism 36 dispensing currency in the amount of the approved transaction to the cashier. The cashier may then tender those funds to the customer.

In a step S8, a transaction record is preferably created. This transaction record may be generated at the server of the cash system 42, such as based upon information received from the cashier workstation 34 and the authentication vendor system 46. The record might comprise one or more of: information regarding the check (check number, bank name, payor name, routing number, amount); amount of the transaction; ID scan information (including information obtained from the magnetic stripe and/or captured image information); vendor authentication results (e.g. the results of the ID authentication provided by the outside authentication vendor); transaction approval or denial and any associated basis for that decision; cashier approval of the transaction; confirmation of the amount of money dispensed by the monetary value dispensing mechanism 36; date/time of transaction; location of the transaction, and cashier ID, etc. As noted, the transaction record may be created relative to transactions which are approved as well as those which are denied.

In a step S9, the transaction record, or one or more elements thereof, are preferably automatically transmitted to the server of the AML system 44. In one embodiment, the AML system server 44 is configured to store monetary transaction information, such as transaction records, and may be configured to analyze those transactions, such as for anti-money laundering compliance issues. For example, the server of the AML system 44 may be configured to analyze transactions, such as by reviewing transactions to determine if they meet a monetary value which requires reporting. In such an event, the server of the AML system 44 may be configured to generate one or more reports and to transmit such reports. The reports may include information which is stored in the transaction record, such as information regarding the customer associated with the transaction. The transaction record may also be used relative to AML incident investigations and the like.

Of course, the above-referenced steps may be performed in other orders or might include a greater or lesser number of steps. Further, the invention may have many variations. As one example, instead of utilizing a secure monetary value dispensing device 36, the cashier may dispense monetary value (such as currency or coins) from a cash drawer or the like. As another example, the transaction record may not be created after the transaction is complete but might be created and updated in stages. For example, the cashier workstation 34 may transmit information to the server of the cash system 42 when a transaction is initiated, at which point the server of the cash system 42 may create a transaction record by opening a new record. After the ID is scanned, that record may be updated with the ID scan information. After the authentication results are received, that record may be updated with those results, etc.

A particular advantage of the invention is that the system is configured to collect ID information and then interface with an outside ID authentication vendor in order to perform ID authentication. Thus, the system includes ID authentication, but does not require the system to actually include devices or systems, for actually performing the ID authentication, including potentially large numbers of databases of ID information or records which must be maintained and kept current. Further, this interfacing allows IDs to be authenticated using state of the art and ever-changing authentication techniques, rather than requiring the system to include those and requiring that the system continuously be updated at great expense.

Another advantage of the invention is that AML transaction reporting is automated and integrated into the cash transaction system, and this information includes detailed ID information. In particular, each time a transaction occurs, the results of the transaction and associated transaction information, including ID information, is captured not only as part of the process of approving or denying the transaction, but it is reported to an AML system for storage, analysis, reporting and/or investigative purposes. This avoids having different systems perform those functions, having to manually move or enter information from one system to another, and increases the amount of information which is associated with the transaction in the AML system.

Additional aspects of the invention will now be described. As indicated, the invention may be implemented relative to a casino system having one or more gaming machines 22 or other devices (gaming tables, kiosks or terminals, etc.) for use in presenting wager-based games, as well as a customer system 60. For example, the casino system might include a ticketing system, a bonusing system, a tournament system, other gaming devices, and external devices. The casino system C might include (either as integrated with or overlapping/connected thereto) other cash-system related features such as ATMs, kiosks and the like which are capable of performing various transactions, such as processing ATM type transactions, check cashing, ticket redemption and the like. In this regard, aspects of the invention may be applied to other devices or systems of the casino, such as in relation to other types of transactions.

For example, in one embodiment, the cashier workstation may run the CashClub® application and interface by Everi Payments Inc. of Las Vegas, Nev. This application interfaces with a back end (such as implemented by the server of the cash system 42) to facilitate monetary transactions, including credit and debit transactions. In such a configuration, the monetary value dispensing mechanism 36 and/or workstation 34 may transmit information to the server of the AML system 44 (such as through the cash system server) regarding the amount of cash that was dispensed, along with customer information (such as from their scanned ID), thus allowing the server of the AML system 44 to aggregate that cash amount with other transactions that customer. For example, a cashier may perform cash advance for a customer via their workstation 34 via the CashClub® system (such as based upon a provided debit card and ID of the customer), and the CashClub® system (such as via the server of the cash system 42) instructs the monetary value dispensing mechanism 36 to dispense $2000, at which time the cash system transmits information to the server of the AML system 44 that a $2000 cash transaction was performed for that customer.

As another aspect of the invention, by the system reading a customer's ID and then authenticating that ID information, the information can be used to complete forms in cash processing systems and the results of the authentication will can be transmitted to and used by the AML system/server for fraud detection purposes. For example, a customer might provide an ID to the cashier. The cashier scans the ID and transmits it to the authentication vendor which, upon analysis of the ID information determines that the ID is not authentic. This information is routed to the AML server (for example, such information might comprise: Patron ABC with Doc XYZ failed UV and white light security tests). The information may be stored at the server of the AML system 44 for later investigative purposes and/or for use in later cross-reference to other transactions (for example, if the same customer later attempted to perform another transaction, the earlier detection of a fraudulent ID might be used to trigger an immediate refusal of the following transaction).

In one embodiment of the invention, features of the invention may be implemented via other devices or integrated with such devices. For example, the casino system C or the cash system 42 may include one or more kiosks. The kiosks may comprise a housing or terminal with a display, a processor, a memory, one or more input devices (such as a touch-screen, buttons, keypad or the like), and software stored in the memory and executable by the processor. The kiosks may also include at least one reader, such as an optical reader or scanner. In one embodiment, a player may utilize the kiosk to self-validate an ID, rather than providing such to a cashier at a cashier cage 26. For example, the kiosk might be located adjacent to a casher cage 26 and be linked to the station. The player might approach the kiosk and select a "validate ID" function or might elect to initiate a transaction at the kiosk (such as to create or enroll in a wallet program, player loyalty program, to perform a financial transaction or the like). To validate their ID, such as directly or as part of such a requested transaction, the player might provide an ID such as described above to the reader or scanner which reads or scans information therefrom. The kiosk may then validate the ID in a similar manner to that described above (such as by validation with an outside authentication vendor). Once the player's ID is validated, the transaction might be completed or the player might go to the cashier cage 26 to complete the transaction (such as to obtain requested funds in a monetary transaction). The player might provide their ID or otherwise identify themselves, wherein the cashier may confirm that the player's ID has already been validated by the system, thus eliminating steps S2-S4 of FIG. 2.

As indicated, other aspects of the invention comprise other aspects of player identification or identification confirmation, which aspects may be used separately or in conjunction with other aspects of the invention. For example, as indicated above, cameras or biometric sensors may be used to capture player information, which information may be used to identify a player or confirm the identity of a player.

As one example, a player might provide an ID to a kiosk (such as via a camera or other reader/scanner). The kiosk may include a camera. The kiosk or a remote server may store information read from the ID, such as the player's image (such as cropped from the player's ID). In addition, the camera may capture an image of the player. The kiosk or a remote server may compare the image of the player which is captured with the camera to the image of the player obtained from the ID. If a match is confirmed (such as by use of known image comparison software), the player may be permitted to proceed with a desired transaction (such as a monetary transaction implemented by the kiosk or an associated cashier cage 26. Further as detailed herein, other information might be used to verify the identify of the player or customer, such as from other biometrics, and such information may be collected and used at other devices, such as at gaming machines 22. Collected biometric information may be stored, such as in a database associated with the customer server 60, such as for later use in identifying the player.

While the invention has been described with reference to a "player", it is noted that the invention may apply to any persons, such as customers or patrons (such a persons who are not playing games, but might be engaged in other activities).

It will be understood that the above described arrangements of apparatus and the method there from are merely illustrative of applications of the principles of this invention and many other embodiments and modifications may be made without departing from the spirit and scope of the invention as defined in the claims.

What is claimed is:
1. A casino monetary system comprising:
a cashier workstation comprising a processor, a memory, at least one user input device, a display, a communication interface and machine-readable code stored in said memory and executable by said processor;
an ID scanner communicatively coupled to said cashier workstation via said communication interface thereof, said ID scanner configured to accept input of a customer ID and to generate ID information based on said input, said ID information comprising at least one of a white light image of the front and/or back of said customer ID, a UV light image of the front and/or back of said customer ID, an IR light image of the front and/or back of said customer ID, and information from a magnetic stripe of said customer ID;
a cash dispenser;
a cash system server comprising a processor, a memory, a communication interface and machine-readable code stored in said memory thereof and executable by said processor thereof;

an AML server comprising a processor, a memory, a communication interface and machine-readable code stored in said memory thereof and executable by said processor thereof;

said machine-readable code of said cash system server configured to cause said processor thereof to, upon receiving said ID information transmit said ID information via said communication interface of said cash system server to a remote vendor authentication system for analysis of the ID information to verify the authenticity of the customer ID, to receive ID authentication results and utilize those results in generating a monetary transaction approval or denial, wherein said monetary transaction is denied when said customer ID is not authenticated and wherein when said monetary transaction is approved, generating instructions to cause said cash dispenser to dispense an amount of cash, and said cash system server configured to transmit transaction information including said ID authentication results to said AML server for storage and analysis by said AML server and generation of one or more reports.

2. The system of claim 1 wherein said ID scanner comprises one or more of a white light, IR and UV optical scanner.

3. The system of claim 1 wherein said ID scanner comprises a bar code reader.

4. The system of claim 1 wherein said ID scanner is associated with a kiosk, said kiosk having a housing and a video display.

5. The system of claim 1 wherein said transaction information comprises information regarding said amount of said cash.

6. The system of claim 1 wherein said cashier workstation is communicatively coupled to a casino system, said casino system comprising a casino server and a customer database, said customer database storing information regarding one or more customers.

7. The system of claim 1 wherein said monetary transaction comprises the cashing of a check.

8. The system of claim 1 wherein said ID comprises a driver's license.

9. The system of claim 1 further comprising an image capture device configured to capture an image of said customer, said machine-readable code of said cash system server further configured to said processor thereof to compare said image of said customer to an image associated with said customer ID to validate an identity of said customer and utilize results of said validation of said identity in generating said monetary transaction approval or denial.

10. A method of processing a casino transaction comprising the steps of:
receiving a customer ID;
generating ID information associated with said ID using at least one ID reader associated with a cashier workstation, said a cashier workstation comprising a processor, a memory, at least one user input device, a display, a communication interface and machine-readable code stored in said memory and executable by said processor, the ID information comprising one or more images of the ID and information from a magnetic stripe of said customer ID;

transmitting said ID information to a remote vendor authentication system for authentication of said customer ID;

obtaining an authorization response from said remote vendor authentication system;

utilizing said authentication response to generate a monetary transaction approval or denial, comprising generating a denial when said customer ID is not authenticated and wherein when said monetary transaction is approved, dispensing cash to said customer; and transmitting transaction information including said authentication response to said AML server, said AML server comprising a processor, a memory, a communication interface and machine-readable code stored in said memory thereof and executable by said processor thereof, said AML server configured to store said transaction information, analyze said transaction information, and generate one or more reports.

11. The method in accordance with claim 10 further comprising receiving a request for said monetary transaction from said customer at said cashier workstation.

12. The method in accordance with claim 11 wherein said monetary transaction comprises cashing a check.

13. The method of claim 10 wherein said step of dispensing cash comprises dispensing said cash from a secure, automatic cash dispenser associated with said cashier workstation.

14. The method of claim 10 comprising transmitting said ID information from said cashier workstation to a cash system server and transmitting said ID information from said cash system server to said remote vendor authentication system.

15. The method of claim 14 wherein said authorization response is obtained by said cash system server, said cash system server generates said monetary transaction approval or denial and forwards same to said cashier workstation.

16. The method of claim 15 wherein when said monetary transaction is approved, transmitting a cash dispense signal from said cash system server to a cash dispenser associated with said casher workstation.

17. The method of claim 10 wherein said transaction information comprises an amount of said monetary transaction.

18. The method of claim 10 further comprising the step of said AML server generating one or more monetary transaction reporting forms.

19. The method of claim 10 further comprising capturing an image of said customer and comparing said image of said customer to an image associated with said customer ID to validate an identity of said customer and utilize results of said validation of said identity in generating said monetary transaction approval or denial.

* * * * *